United States Patent [19]

Hopkins et al.

[11] Patent Number: 4,560,469

[45] Date of Patent: Dec. 24, 1985

[54] CATALYTIC DEWAXING PROCESS

[75] Inventors: P. Donald Hopkins, St. Charles; Thomas D. Nevitt; Eugene E. Unmuth, both of Naperville, all of Ill.

[73] Assignee: Standard Oil Company (Indiana), Chicago, Ill.

[21] Appl. No.: 686,078

[22] Filed: Dec. 24, 1984

[51] Int. Cl.[4] ............................................. C10G 45/60
[52] U.S. Cl. ..................................... 208/110; 208/111
[58] Field of Search ................................ 208/110, 111

[56] References Cited

U.S. PATENT DOCUMENTS

| | | | |
|---|---|---|---|
| 4,105,535 | 8/1978 | Peters | 208/111 |
| 4,327,236 | 4/1982 | Klotz | 208/111 |
| 4,431,517 | 2/1984 | Nevitt et al. | 208/111 |
| 4,431,518 | 2/1984 | Angevine et al. | 208/111 |
| 4,434,047 | 2/1984 | Hensley et al. | 208/111 |
| 4,472,266 | 9/1984 | Oleck et al. | 208/111 |
| 4,483,764 | 11/1984 | Hensley et al. | 208/111 |

*Primary Examiner*—John Doll
*Assistant Examiner*—O. Chaudhuri
*Attorney, Agent, or Firm*—Ekkehard Schoettle; William I. McClain; William H. Magidson

[57] ABSTRACT

The present invention provides for an improved process for catalytically dewaxing and thereby reducing the pour point of hydrocarbon feedstock by contacting the feedstock and hydrogen with a catalyst. Specifically, the catalytic dewaxing process of the present invention involves contacting the hydrocarbon feed with hydrogen under catalytic dewaxing conditions in the presence of a catalytic composition comprising a crystalline borosilicate molecular sieve and a hydrogenation component consisting essentially of nickel.

17 Claims, No Drawings

CATALYTIC DEWAXING PROCESS

BACKGROUND OF THE INVENTION

This invention relates to catalytic dewaxing hydrocarbon feed materials. More particulary, this invention relates to a single-step catalytic dewaxing process for production of lube oil base stocks from a wide range of feeds including relatively low quality, contaminant-containing, waxy hydrocarbon feeds, fuel oils, waxy lube oil distillates, waxy lube oil solvent raffinates, lube oil distillates, and raffinates which have previously been partially dewaxed by solvent dewaxing.

Catalytic dewaxing of petroleum and synthetic crude oil fractions in the presence of shape-selective catalysts capable of selectively cracking n-paraffins and isoparaffins is well-known. For example, U.S. No. Re. 28,398 (Chen et al.), which is a reissue of U.S. Pat. No. 3,700,585, discloses the use of shape-selective crystalline aluminosilicate zeolite ZSM-5 in catalytic dewaxing processes directed at removing high freezing point paraffins from jet fuel to lower the freezing point, improving the octane rating of naphtha fractions and lowering the pour point of lube oil base stocks. According to Chen et al., the shape-selective cracking ability of crystalline aluminosilicate ZSM-5 permits selective cracking of n-paraffins and certain isoparaffins without substantial cracking of desirable feed components such that improved catalytic dewaxing products are obtained under both hydrotreating and hydrocracking conditions. Chen et al. also disclose the use of crystalline aluminosilicate zeolite ZSM-5 associated with hydrogenating metals such as tungsten, vanadium, molybdenum, rhenium, nickel, cobalt, chromium, magnanese, platinum or palladium, such metals being associated with the zeolite by exchange or impregnation.

U.S. No. Re. 30,529, which is a reissue of U.S. Pat. No. 4,100,056, discloses catalytic dewaxing of atmospheric and vacuum distillates in the presence of a catalyst containing mordenite in hydrogen form and a Group VI or VIII metal to obtain naphthenic lube oils of intermediate viscosity index and pour points ranging from $-50°$ to $+20°$ F.

U.S. Pat. No. 4,222,855 (Pelrine et al.) discloses catalytic dewaxing of $450°-1,050°$ F. hydrocarbon fractions to produce high viscosity index (VI) lube oils employing a catalyst containing crystalline aluminosilicate zeolite ZSM-23 or ZSM-35, preferably in hydrogen form and associated with platinum, palladium or zinc. According to the abstract, the use of catalysts containing crystalline aluminosilicate zeolite ZSM-23 or ZSM-35 gives products of a higher viscosity index and lower pour point than products obtained through the use of crystalline aluminosilicate zeolite ZSM-5.

U.S. Pat. No. 4,247,388 (Banta et al.) is directed to improving crystalline aluminosilicate zeolites such as ZSM-5 in terms of dewaxing performance by treatment to adjust alpha activity. According to the patentee, alpha activity is adjusted by partial replacement of cationic sites of the crystalline aluminosilicate zeolite with basic cations such as sodium, by partial coking of the zeolite, by employing the zeolite in combination with an inert matrix material, by manipulating the silica-to-alumina ratio of the zeolite or preferably, by steaming. Crystalline aluminosilicate zeolites adjusted in terms of alpha activity can be employed in association with exchanged or impregnated hydrogenating metals such as tungsten, vanadium, molybdenum, rhenium, nickel, cobalt, chromium, manganese, platinum or palladium. A disclosure similar to that of Banta et al. is found in an abstract of British Pat. No. 2,027,742.

U.S. Pat. No. 4,251,348 and U.S. Pat. No. 4,282,085 (both O'Rear) are directed to processes similar to those described hereinabove wherein a low nitrogen content petroleum distillate fraction boiling from $180°-1,200°$ F. is contacted with crystalline aluminosilicate zeolite ZSM-5 or a similar crystalline aluminosilicate zeolite in a form substantially lacking in hydrogenation activity to form an effluent which then is fractionated into an upgraded product stream and a $C_3-C_4$ olefin fraction. If desired, the crystalline aluminosilicate zeolite can be dispersed in a porous matrix having only insubstantial cracking activity. Suitable matrix materials include pumice, firebrick, diatomaceous earth, alumina, silica, zirconia, titania, amorphous silica-alumina mixtures, bentonite, kaolin, silica-magnesia, silica-zirconia or silica-titania. A similar disclosure is found in an abstract of Belgian Pat. No. 877,772.

U.S. Pat. No. 4,259,174 (Chen et al.) discloses catalytic dewaxing of hydrocarbon feeds to reduce pour point and produce high viscosity index distillate lube oil stocks in the presence of a synthetic offretite crystalline aluminosilicate zeolite catalyst which may contain exchanged or impregnated hydrogenating metals such as tungsten, vanadium, molybdenum, rhenium, nickel, cobalt, chromium, manganese, platinum or palladium. The crystalline aluminosilicate zeolite may be dispersed within a matrix of alumina, silica, silica-alumina, etc. (Column 5, line 67-Column 6, line 17). It is unclear whether the patentee contemplates use of the crystalline aluminosilicate zeolite in association with both hydrogenating metals and matrix materials.

An abstract of British Pat. No. 2,055,120 (Mobil) discloses a method for reclaiming or upgrading contaminated, dewaxed lube oil base stocks having a tendency to form a waxy haze during storage, comprising contacting the oil with hydrogen at $500°-675°$ F. and space velocity of 2-10 in the presence of a crystalline aluminosilicate zeolite having a silica-to-alumina ratio of at least 12 and a constraint index of 1-12.

Another catalytic dewaxing process is disclosed in U.S. Pat. No. 4,360,419 (Miller). In particular, a hydrocarbonaceous feed containing normal and slightly-branched chain hydrocarbons is contacted with a catalyst which comprises a hydrogenation component and a zeolite having a mole ratio of an oxide selected from silicon oxide, germanium oxide, and mixtures thereof to an oxide selected from aluminum oxide, gallium oxide, and mixtures thereof greater than about 5:1 and having X-ray diffraction lines as shown in the '419 specification.

U.S. Pat. No. 4,343,692 (Winquist) discloses a process for catalytically hydrodewaxing distillates or residual fractions by contacting the same with hydrogen and a catalyst comprising a synthetic ferrierite zeolite having incorporated therewith at least one metal selected from the group consisting of Group VIB, Group VIIB and Group VIII.

U.S. Pat. No. 4,388,177 (Bowes et al.) discloses a process for selectively hydrocracking straight chain and single methyl branched hydrocarbons contained in a reformate or waxy hydrocarbon oil feed by contacting the feed with hydrogen and a catalyst composition comprising a natural ferrierite and at least one hydrogenation component selected from the metals of Group VIA and Group VIII. The natural ferrierite is pretreated by contacting it with an oxalate ion under conditions effective to impart to the ferrierite a constraint index from about 1 to 12.

Yet another dewaxing process is disclosed in U.S. Pat. No. 4,390,414 (Cody) which process involves contacting a waxy hydrocarbon oil stock in the presence of hydrogen with a zeolite which has been chemically modified by reaction, under dry, anhydrous conditions, with an organosilane wherein the zeolite has some sites capable of reacting with the organosilane and wherein said organosilane is: (a) capable of entering into the channels of the zeolite and chemically reacting with the reactive sites present therein, as well as (b) capable of reacting with hydroxyl groups present on the external surface of said zeolite, and which zeolite has been loaded with a catalytically active hydrogenating metal component; and contacting being conducted under conditions of pressure, temperature and liquid flow velocity sufficient to effect the hydrodewaxing. The zeolite contemplated for use in the Cody reference is any natural or synthetic unfaulted aluminosilicate material.

Another relevant disclosure is found in U.S. Pat. No. 4,176,050 (Chen, et al.) directed to a dewaxing process using macrocrystalline ZSM-5 preferably associated with a hydrogenation metal such as platinum, palladium, zinc, or nickel.

U.S. Pat. No. 4,153,540 (Gorring, et al.) teaches a process for upgrading shale oil with a dewaxing catalyst comprising a metal such as nickel or palladium together with a crystalline zeolite having a silica/alumina ratio greater than 12 and a constraint index of 1 to 12, such as ZSM-5.

Along the same vein, U.S. Pat. No. 3,968,024 (Gorring et al.) discloses a dewaxing process using a catalyst comprising crystalline alumino-silicate zeolite such as ZSM-5 together with a metal selected from the group consisting of zinc, cadmium, palladium, and nickel.

As can be gleaned from the above, the art is replete with various catalytic dewaxing processes wherein the catalyst employed typically contains an aluminosilicate.

A further relevant disclosure is found in U.S. Pat. No. 4,431,518 (Angevine et al.) wherein a process for the reduction of the pour point of an oil feedstock is disclosed utilizing a catalyst comprising a boron-containing material having an X-ray diffraction pattern substantially as set out in the subject patent. The x-ray diffraction pattern shown in the subject patent is that of a conventional aluminosilicate zeolite ZSM-5. The patentee points out that a borosilicate-containing dewaxing catalyst is superior to the conventional alumino silicate containing dewaxing catalysts discussed above because the borosilicate-containing dewaxing catalyst is substantially more nitrogen resistant and thus can be used to dewax feedstocks containing high concentrations of nitrogen compounds. The subject patent is silent with respect to the specific efficacy afforded by a catalyst containing a nickel hydrogenation component and a borosilicate material in connection with a dewaxing process.

The subject patent broadly teaches the cation-exchange of the original alkali metal of the boron-containing zeolite ZSM-5 with cations selected from the group consisting of metal ions, ammonium ions, and hydrogen ions, where metal ions include those selected from the group consisting of metals Group(s) II and VIII of the periodic table, rare earth metals, calcium and manganese. The subject patent further teaches the cation-exchange of the original alkali metal of the boron-containing zeolite ZSM-5 with cations selected from the group consisting of metal ions, ammonium ions, and hydrogen ions, where metal ions include those selected from the group of Group(s) II and VIII. Periodic table metals, rare earth metals and calcium and manganese.

In preparation of lube oils from hydrocarbon feeds, catalytic dewaxing processes such as described hereinabove often are combined with hydrotreating, hydrocracking and/or various solvent extraction steps to obtain products having desired properties. Typically, hydrocracking and/or solvent extraction steps are conducted prior to catalytic dewaxing to remove components such as metal-containing feed components, asphaltenes and polycyclic aromatics having properties that differ grossly from those desired. In particular, solvent extraction is conducted to remove polycyclic aromatic feed components and nitrogen-containing cyclic components, removal of the latter being particularly important in order to avoid poisoning of catalysts in catalytic dewaxing. Hydrotreating under mild or severe conditions typically follows catalytic dewaxing operations and serves to improve such lube oil properties as stability and viscosity index.

One example of a process for producing lube oils in which a catalytic dewaxing step is included as part of a multistep process, namely U.S. Pat. No. 4,259,170 (Graham et al.), discloses a process that includes a combination of catalytic dewaxing and solvent dewaxing steps. According to a more specific aspect of Graham et al., the process includes a solvent extraction step prior to the dewaxing steps. As a further example of a multistep process for preparation of lube oils, Chen et al. '174, discussed hereinabove, discloses a process comprising solvent extraction followed by catalytic dewaxing.

U.S. Pat. No. 4,283,272 (Garwood et al.) discloses preparation of lube oils by a process that includes hydrocracking, catalytic dewaxing and hydrotreating steps.

U.S. Pat. No. 4,292,166 (Gorring et al.) discloses a combination process wherein a dewaxing step is carried out prior to a hydrocracking step. Specifically, a hydrocarbon oil feed selected from the group consisting of vacuum gas oils, deasphalted oils and mixtures thereof is converted to a low pour point, high VI lube base stock by first dewaxing the feed in the presence of hydrogen and a dewaxing catalyst comprising a zeolite having a constraint index of 1 to 12, followed by contacting the dewaxed feedstock and hydrogen, with a hydroconversion catalyst comprising a platinum group metal and a zeolite having a silica-to-alumina ratio of at least 6.

Finally, a combination process is disclosed in European Patent Application No. 82300226.6 (Smith et al.) wherein a hydrocarbon oil containing impurities deleterious to the catalyst is first treated with a sorbent comprising a first molecular sieve zeolite having pores with an effective diameter of at least about 5 Angstroms under sorption conditions, followed by a treatment with a dewaxing catalyst comprising a second molecular sieve zeolite having pores with an effective diameter of at least about 5 Angstroms and equal to or smaller than the effective diameter of the pores of the first molecular sieve zeolite. In a more specific aspect of the disclosure, the first and second molecular sieves have the same crystal structure wherein the constraint index is 1 to 12 and the dried hydrogen form crystal density is less than about 1.6 grams per cubic centimeter.

Despite the plethora of catalytic dewaxing processes disclosed in the art there is still a need for an improved catalytic dewaxing processing. More specifically, there is a need for a catalytic dewaxing process wherein the dewaxing catalyst is nitrogen resistant and produces a lube base product possessing an improved VI coupled with greater lube base stock yields.

Accordingly, it is an object of the present invention to provide a process for dewaxing feedstocks which contain nitrogen compounds which process produces lube base stocks in higher yields possessing greater VIs.

It has now been discovered that a particular molecular-containing catalyst produces improved results in sieve connection with a hydrocarbon dewaxing process. In particular, a dewaxing process employing a catalyst comprising a crystalline borosilicate and a hydrogenation component consisting essentially of nickel results in high lube yields with concomitant less light gas make. Further, the process of the present invention provides a lube oil base stock possessing a high viscosity index and a reduced sulfur content.

In connection with the present invention it should be noted that hydrogen processing catalysts containing an AMS type borosilicate molecular sieve coupled with catalytic metal components are known. For instance, commonly assigned U.S. Pat. No. 4,434,047 (Hensley, Jr. et al.) discloses a catalytic dewaxing hydrotreating process using a catalyst containing a shape selective zeolite cracking component such as an AMS type molecular sieve, and hydrogenating component containing Cr, at least one other Group VIB metal and at least one Group VIII metal. U.S. Pat. No. 4,268,420 discloses an AMS type crystalline borosilicate which can be used in combination with nickel, however the reference is silent with respect to the catalyst's efficacy in a dewaxing process for the reduction of the pour point of a hydrocarbon feedstock.

Further, co-pending commonly assigned U.S. Ser. No. 200,536 discloses catalytic compositions comprising chromium, molybdenum, at least one Group VIII metal, a crystalline molecular sieve, and a refractory inorganic oxide, suitable for use in a process for hydrogenation nd hydrocracking of high-nitrogen content feeds. The subject application also discloses the use of a crystalline borosilicate in connection with the above described catalytic composition.

SUMMARY OF THE INVENTION

The present invention involves an improved process for catalytically dewaxing and thereby reducing the pour point of a hydrocarbon feedstock by contacting the feedstock and hydrogen with a catalyst. Specifically, the catalytic dewaxing process of the present invention involves contacting the hydrocarbon feed with hydrogen under catalytic dewaxing conditions in the presence of a catalytic composition comprising a crystalline borosilicate molecular sieve and a hydrogenation component consisting essentially of nickel.

DETAILED DESCRIPTION OF THE INVENTION

Briefly, the catalytic dewaxing process of the present invention comprises contacting a hydrocarbon feed with hydrogen under catalytic dewaxing conditions in the present of a catalyst comprising a crystalline borosilicate molecular sieve and a hydrogenation component consisting essentially of nickel. According to a more specific aspect of the invention there is provided an improved process for preparation of lube oils of low pour point and high viscosity index consisting essentially of catalytically dewaxing a petroleum or synthetic crude oil fraction which may contain appreciable quantities of aromatics and impurities such as sulfur or nitrogen, in the presence of the aforesaid catalyst.

In greater detail, the hydrocarbon feed materials employed according to the present invention are whole petroleum or synthetic crude oils, coal or biomass liquids, or fractions thereof. Narrower fractions include fuel oils, waxy lube oil distillates, waxy lube oil solvent raffinates and lube oil distillates or raffinates which have been previously partially dewaxed by solvent dewaxing, e.g., toluene-methyl ethyl ketone propane dewaxing. The catalytic dewaxing process of the present invention gives particularly good results with respect to feeds containing sufficiently high levels of waxy components as to exhibit pour points of at least about 30° F. Preferred feed materials for preparation of lube oil base stocks by the single step process of this invention are distillate fractions boiling above about 500° F. and having pour points of about 50° to about 130° F. Both vacuum and atmospheric distillate fractions are contemplated according to the invention as are deasphalted resids or other fractions that have been hydrotreated or hydrocracked to reduce boiling point and/or remove impurities such as sulfur, nitrogen, oxygen or metals. While such feeds are contemplated, it should be understood that the feed materials employed according to the present invention can contain appreciable levels of impurities such as sulfur, nitrogen and/or oxygen. For example, up to about 2 wt% sulfur, 1.5 wt% oxygen and/or about 0.5 wt% nitrogen can be present in the feed without adversely affecting the dewaxing process.

Catalytic dewaxing conditions employed according to the present invention vary somewhat depending upon the choice of feed material. In general, however, the temperature ranges from about 500° to about 900° F., the total pressure ranges from about 100 to about 3,000 psig, hydrogen partial pressure ranges from about 50 to about 2,500 psig, linear hourly space velocity (LHSV) ranges from about 0.1 to about 20 volumes of feed per volume of catalyst per hour (reciprocal hours) and the hydrogen addition rate ranges from about 500 to about 20,000 standard cubic feet per barrel (SCFB).

Contacting the hydrocarbon feed with hydrogen under the aforesaid conditions can be conducted using either a fixed or expanded bed of catalyst in a single reactor or a series of reactors as desired.

The catalyst employed according to the present invention comprises a crystalline borosiliate molecular sieve and a hydrogenation component consisting essentially of nickel.

Crystalline borosilicate molecular sieves of the AMS type are preferred and have the following composition in terms of mole ratios of oxides:

$$0.9 \pm 0.2 M_{2/n}O:B_2O_3:YSiO_2:ZH_2O$$

wherein M is at least one cation having a valence of n, Y ranges from about 4 to about 600 and Z ranges from 0 to about 160, and provide an X-ray diffraction pattern comprising the following X-ray diffraction lines and assigned strengths.

| d (Å) | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VM-M |

Such crystalline borosilicates typically are prepared by reaction of boron oxide and a silicon-containing material in a basic medium such as a metal or ammonium hydroxide. The preferred borosilicate by virtue of its superior stability and selectivity is the HAMS-1B type which is in the hydrogen form. Further details with respect to these shape-selective crystalline borosilicte molecular sieve cracking component are found in commonly assigned U.S. Pat. No. 4,269,813 (Klotz) which is incorporated herein by reference wherein the AMS-1B crystalline borosilicate molecular sieve is disclosed.

AMS-1B crystalline borosilicate molecular sieves can also be prepared by crystallizing a mixture of an oxide of silicon, an oxide of boron, an alkylammonium compound and ethylenediamine. This method is carried out in a manner such that the initial reactant molar ratios of water to silica range from about 5 to about 25, preferably about 10 to about 22, and most preferably about 10 to about 15. In addition, preferable molar ratios for initial reactant silica to oxide of boron range from about 4 to about 150, more preferably about 5 to about 80, and most preferably about 5 to about 20. The molar ratio of ethylenediamine to silicon oxide used in the preparation of AMS-1B crystalline borosilicate should be above about 0.05, typically below about 5, preferably about 0.1 to about 1.0, and most preferably about 0.2 to about 0.5. The molar ratio of alkylammonium template compound or precursor to silicon oxide useful in the preparation of this invention can range from 0 to about 1 or above, typically above about 0.001, preferably about 0.005 to about 0.1, and most preferably from about 0.005 to about 0.02. The silica source is preferably a low sodium content silica source containing less than 2,000 ppmw Na and most preferably less than 1,000 ppmw, such as Ludox AS-40 which contains 40 wt.% $SiO_2$ and 0.08wt.% $Na_2O$ or Nalco 2327 which has similar specifications.

It is noted that the preferable amount of alkylammonium template compound used in the instant preparation method is substantially less than that required to produce AMS-1B conventionally using an alkali metal cation base.

The borosilicate prepared by the instant method typically contains at least 9,000 ppmw boron and less than about 100 ppw sodium and is designated as HAMS-1B-3. The HAMS-1B-3 crystalline borosilicate has a higher boron content and a lower sodium content than crystalline borosilicates formed using conventional techniques.

Although not required, it is preferred to employ the above-described borosilicate molecular sieve component dispersed in a matrix of at least one non-molecular sieve, porous refractory inorganic oxide matrix component as the use of such a matrix component facilitates provision of the ultimate catalyst in a shape or form well suited for process use. Useful matrix components include alumina, silica, silica-alumina, zirconia, titania, etc., and various combinations thereof. The matrix component also can contain various adjuvants such as phosphorus oxides, boron oxides and/or halogens such as fluorine or chlorine. Usefully, the molecular sieve matrix dispersion contains about 5 to about 70 wt% molecular sieve component and about 30 to about 95 wt% matrix component.

Methods for dispersing molecular sieve materials within a matrix component are well-known to persons skilled in the art and applicable with respect to the borosilicate molecular sieve materials employed according to the present invention. A preferred method is to blend the shape-selective molecular sieve component, preferably in a finely divided form, into a sol, hydrosol or hydrogel of an inorganic oxide, and then add a gelling medium such as ammonium hydroxide to the blend with stirring to produce a gel. The resulting gel can be dried, dimensionally formed if desired, and calcined. Drying preferably is conducted in air at a temperature of about 80° to about 350° F. (about 27° to about 177° C.) for a period of several seconds to several hours. Calcination preferably is conducted by heating in air at about 800° to about 1,200° F. (about 427° to about 649° C.) for a period of time ranging from about ½ to about 16 hours.

Another suitable method for preparing a dispersion of shape-selective molecular sieve component in a process refractory oxide matrix component is to dry blend particles of each, preferably in finely divided form, and then to dimensionally form the dispersion if desired.

The hydrogenation component of the catalyst employed according to the present invention may be present in elemental form, as oxides or sulfides, or as combinations thereof. The hydrogenation component consists essentially of nickel.

The catalyst employed in the present invention process containing nickel and borosilicate material provides a product which contains a substantially higher VI at the same pour point, than a process employing a conventional aluminosilicate-palladium containing processing.

Relative proportions of the borosilicate molecular sieve component and the hydrogenation component of the catalysts are such that at least a catalytically effective amount of each is present. Preferably, catalysts employed according to the invention contain about 10 to about 70 wt% of the borosilicate molecular sieve component and about 0.01 to about 10 wt% of the hydrogenation component based on total catalyst weight. More preferably, borosilicate molecular sieve component concentration ranges from about 20 to about 60 wt% in order to attain a desirable degree of selective dewaxing activity while avoiding inclusion in the catalyst of amounts of borosilicate component that unduly increase the cost of the ultimate catalyst. When the borosilicate component is employed as a dispersion in a matrix component, preferred matrix component content ranges from about 20 to about 70 wt% based on total catalyst weight.

The nickel hydrogenation component content preferably ranges from about 0.01 to about 10 wt% calculated as the oxide of the metal and being based on the total weight of the catalytic composite, with about 0.01 to about 5 wt% being more preferred. Most preferred is a level of 0.4 to 2.0 wt%. A higher level of nickel can be employed if desired though the degree of improvement resulting therefrom typically is insufficient to justify the added cost of the metals.

The hydrogenation component of the catalyst employed according to this invention can be associated with the borosilicate molecular sieve component by impregnation of the borosilicate component, or the borosilicate component dispersed in a porous refractory inorganic oxide matrix, with one or more solutions of compounds of the hydrogenation component which compounds are convertible to oxides on calcination. It also is contemplated, however, to impregnate a porous refractory inorganic oxide matrix component with such solutions of the hydrogenation components and then blend the borosilicate component with the resulting impregnation product. Accordingly, the present invention contemplates the use of catalysts in which the hydrogenation component is deposed on the borosilicate component, on a borosilicate matrix component dispersion or on the matrix component of a borosilicate matrix dispersion.

The mechanics of impregnating the borosilicate component, matrix component or borosilicate matrix composite with solutions of compounds convertible to metal oxides on calcination are well-known to persons skilled in the art and generally involve forming solutions of appropriate compounds in suitable solvents, preferably water, and then contacting the borosilicate matrix component or borosilicate matrix dispersion with an amount or amounts of solution or solutions sufficient to deposit appropriate amounts of metal or metal salts onto the borosilicate or borosilicate matrix dispersion. Useful metal compounds convertible to oxides are well-known to persons skilled in the art and include various ammonium salts as well as metal acetates, nitrates, anhydrides, etc. Specific examples of useful metal compounds include nickel nitrate and nickel acetate.

The above-described catalysts can be employed in any suitable form such as spheres, extrudates, pellets, or C-shaped or cloverleaf-shaped particles.

The catalytic dewaxing process described hereinabove can be included as part of a multistep process for preparation of lube oils wherein catalytic dewaxing is conducted in combination with other conventional processing steps such as solvent extraction, deasphalting, solvent dewaxing, hydrocracking and/or hydrotreating, to obtain lube oil base stocks of relatively low pour point and high viscosity index and stability.

According to a preferred aspect of the invention, however, there is provided an improved process for preparation of high quality lube oils base stocks of high viscosity index, low pour point and good stability consisting essentially of catalytically dewaxing a petroleum or synthetic crude oil fraction containing up to about 2 wt% sulfur, 1.5 wt% oxygen and/or 0.5 wt% nitrogen in the presence of the aforesaid catalyst. Preferred conditions according to this aspect of the invention include temperatures ranging from about 500° to about 750° F., total pressures of about 300 to about 900 psig, LHSVS of about 0.20 to about 5.0 reciprocal hours hydrogen partial pressures of about 300 to 800 psig, and hydrogen addition rates of about 2000 to about 5,000 SCFB.

The catalytic dewaxing processing described hereinabove can be included as part of a multistep process for the preparation of lube oils wherein catalytic dewaxing is conducted in combination with other conventional processing steps such as solvent extraction, deasphalting, solvent dewaxing, hydrocracking and/or hydrotreating to obtain lube oil base stocks of relatively low pour point and high viscosity index and stability.

In a highly preferred aspect of the present invention, the feedstock to the dewaxing process is solvent-extracted with N-methyl-2-pyrrolidone (NMP) in a conventional manner followed by hydrotreatment in a conventional manner prior to passage to the dewaxing zone in a manner disclosed and claimed in U.S. Ser. No. 686,077 filed on even date and incorporated herein by reference.

We have discovered that while the borosilicate-containing dewaxing catalyst is generally more nitrogen resistant than conventional aluminosilicate-containing dewaxing catalysts, basic nitrogen compounds, such as NMP contained in NMP-extracted raffinates, result in premature deactivation of the borosilicate catalyst. Hence, in accordance with a highly preferred aspect of the present invention, the effluent from an NMP extraction zone is hydrotreated to reduce the amount of nitrogen, specifically basic nitrogen compounds, contained in the dewaxing zone influent. The sulfur content of the dewaxing zone influent is likewise reduced in the hydrotreating zone, thereby reducing any sulfur poisoning of the hydrogenation component in the dewaxing catalyst. It is believed this results in increased aromatics saturation in the dewaxing zone resulting in an increase in VI of the lube base stock.

Suitable operating conditions in the hydrotreating zone are summarized in Table 1.

TABLE 1

| HYDROTREATING OPERATING CONDITIONS | | |
|---|---|---|
| Conditions | Broad Range | Preferred Range |
| Temperature, °F. | 400–850 | 500–750 |
| Total pressure, psig | 50–4,000 | 400–1500 |
| LHSV | .10–20 | .25–2.5 |
| Hydrogen rate, SCFB | 500–20,000 | 800–6,000 |
| Hydrogen partial pressure, psig | 50–3,500 | 500–1,000 |

The hydrotreater is also preferably operated at conditions that will result in a liquid effluent stream having less than 10 ppmw nitrogen-containing impurities, based on nitrogen, and less than 20 ppmw sulfur-containing impurities, based on sulfur, and most preferably less than 5 ppmw and 10 ppmw, respectively. The above-set out preferred nitrogen and sulfur contents correspond to substantial conversion of the sulfur and nitrogen compounds entering the hydrotreater.

The catalyst employed in the hydrotreater can be any conventional and commercially available hydrotreating catalyst. The subject hydrotreating catalysts typically contain one or more elements from Group IIB, VIB, and VIII supported on an inorganic refractory support such as alumina. Catalysts containing NiMo, NiMoP, CoMo, CoMoP, and NiW are most prevalent.

Other suitable hydrotreating catalysts for the hydrotreating stage of the present invention comprise a Group VIP metal component or a non-noble metal component of Group VIII and mixtures thereof, such as cobalt, molybdenum, nickel, tungsten and mixtures thereof. Suitable supports include inorganic oxides such a alumina, amorphous silica-alumina, zirconia, magnesia, boria, titantia, chronia, beryllia, and mixtures thereof. The support can also contain up to about 20 wt.% zeolite based on total catalyst weight. A preferred hydrotreating catalyst contains sulfides or oxides of Ni and Mo composited with an alumina support wherein the Ni and Mo are present in amounts ranging from 0.1 to 20 wt%, calculated as $MoO_3$, based on total catalyst weight.

Prior to the dewaxing in accordance with a preferred aspect of the present invention, the $H_2S$ and $NH_3$ gases are stripped form the hydrotreater effluent in a conventional manner in a gas-liquid separation zone.

The present invention is described in further detail in connection with the following examples, it being understood that the same are for purposes of illustration and not limitation.

EXAMPLE I

A catalyst support containing 60 wt% of the hydrogen form of AMS-1B crystalline borosilicate material was prepared according to the procedure elucidated below.

432 g of AMS-1B borosilicate molecular sieve were comminuted to pass through a 100-mesh screen (U.S. Sieve Series). This borosilicate material, a commercially prepared material, was also analyzed by an X-ray diffraction analysis technique and was found to be 90% crystalline. The following Table 2 presents the significant interplanar spacings, associated relative intensities (I/Io), and assigned strengths that were found in its X-ray diffraction pattern, which spacings and associated information identify the material as being an AMS-1B borosilicate molecular sieve. The specific type of AMS-1B sieve used in the instant example is designated as HAMS-1B-1 which sieve is characterized by a boron content of about 500 ppm by weight and a sodium content of 250 ppm by weight.

TABLE 2
Condensed X-Ray Diffraction Pattern for AMS-1B Borosilicate

| d (Å) | I/Io | Assigned Strength |
|---|---|---|
| 11.16 | 43 | MS |
| 10.0 | 32 | M |
| 5.97 | 12 | W |
| 3.83 | 100 | VS |
| 3.71 | 45 | MS |
| 3.63 | 29 | M |
| 2.97 | 17 | W |
| 1.98 | 18 | W |

The borosilicate molecular sieve material was suspended in distilled water and vigorously mixed with 2796 g of PHF alumina hydrosol manufactured by American Cyanamid from high-purity alumina. This hydrosol contained approximately 10% $Al_2O_3$ on a dry basis. The blending operation was carried out in a laboratory Waring blender. The sol-sieve slurry was then gelled while blending with 400 ml (14 wt% $NH_3$) $NH_4OH$ solution and subsequently dried overnight at 250° F. The dried solid was comminuted to pass a 100-mesh screen and subsequently extruded through a ⅛" diameter die with a Bonnot laboratory extruder. The extrudate was then dried overnight at 250° F. and calcined at 1000° F. for three hours in air. The finished extrudate was comminuted to pass an 8-mesh screen and be retained on a 14-mesh screen.

EXAMPLE II

In the instant example, Ni was impregnated upon the catalyst support component described in Example I containing 60 wt% of the hydrogen form of AMS-1B crystalline borosilicate material. The subject invention catalyst was designated as catalyst B.

1 wt% Ni was impregnated on 120 grams of the Example I support component. Specifically, 5.94 g Ni($NO_3$)$_2$·$6H_2O$ were dissolved in enough distilled water to make 111.6 cc of solution. This solution was added to the support in a rotary impregnator to the point of incipient wetness. The catalyst was dried for 20 minutes at 250° F. and then dried overnight at room temperature. The catalyst was then calcined in air at 932° for 2 hours.

80 cc of this catalyst were loaded into a pilot plant and then, preheated with a hydrogen reduction, for 3 hours at 600° F. and 800 psig.

The pilot plant contained a downflow ⅜-inch diameter tubular reactor having a length of about 32 inches. The reactor is associated with automatic controls to maintain constant flow rates, temperature and pressure.

The dewaxing feedstock was fed to the pilot plant reactor using a positive displacement pump. Gas and liquid reactor effluents were separated using a high-pressure separator. The off-gas was analyzed daily by a gas chromatograph. Liquid products were vacuum distilled into the appropriate boiling fractions to determine their respective amounts. The lube oil cut point was set such that the sample met the maximum viscosity specification or minimum flash point. The feedstock was an SAE 10 raffinate which has been phenol-extracted commercially to meet the VI specification of 95 and is designated as "RAF-10".

Further feed properties are set out below:

| | |
|---|---|
| Pour Point (°F.) | 95 |
| API Gravity (°) | 32.2 |
| Carbon (wt %) | 86.10 |
| Sulfur (wt %) | .18 |
| Nitrogen (ppm) | 23 |
| Mass Spec. | |
| Paraffins | 39.2 |
| Cycloparaffins | 48.1 |
| Monoaromatics | 3.6 |
| Diaromatics | 3.5 |
| Triaromatics | 0.9 |
| Other Polycyclic Aromatics | 4.6 |
| Simulated Distillation (°F.) | |
| 10 wt % | 722° F. |
| 50 wt % | 833° F. |
| 90 wt % | 895° F. |

The following Table 3 sets out the specific operating conditions, product yields, and product properties resulting from the pilot plant operation carried out in the present example.

TABLE 3

| | | | | | |
|---|---|---|---|---|---|
| Time on stream, hrs | 64 | 161 | 232 | 329 | 473 |
| Avg Cat. Temp., °F. | 600 | 552 | 651 | 601 | 600 |
| LHSV | 0.5 | 0.5 | 0.5 | 0.5 | 0.5 |
| H₂, SCFB | 5000 | 5000 | 5000 | 5000 | 5000 |
| Pressure | 800 | 800 | 800 | 800 | 400 |
| Yields, wt % | | | | | |
| I.B.P.-360° F. | 8.9 | 0.0 | 11.4 | 5.1 | 2.4 |
| 360-650° F. | 9.5 | 0.2 | 10.0 | 8.9 | 9.1 |
| Lube Oil | 63.9 | 94.0 | 59.6 | 76.2 | 73.4 |
| Total Liquid | 82.3 | 94.2 | 81.00 | 90.20 | 84.90 |
| Properties of Lube Oil | | | | | |
| Gravity, API | 29.4 | 31.7 | 29.2 | 30.4 | 30.2 |
| Pour pt, °F. | −5 | +85 | −15 | +35 | +15 |
| Viscosity cSt @ 100° C. | 6.33 | 5.22 | 6.07 | 5.84 | 5.99 |
| Viscosity cSt @ 40° C. | 45.17 | 28.45 | 43.13 | 37.79 | 39.24 |
| Viscosity index | 83 | 115 | 79 | 97 | 94 |
| Sulfur, wt % | .109 | .069 | .085 | .043 | .037 |
| Nitrogen, ppm | 4.4 | 11 | 1.4 | 6.6 | 11 |

EXAMPLE III

The experiment in the present Example was carried out for comparative purposes. A catalyst support component was prepared using ZSM-5 as the sieve component of the support. The particular ZSM-5 utilized possessed a 30:1 $SiO_2:Al_2O_3$ ratio and was in the hydrogen form.

The preparation procedures involved adding 30 g of steratex to 350 g of ZSM-5 and mixing the same. The mixed powder was then placed in a speed muller where 2534 g of alumina hydrosol (10 wt% $Al_2O_3$ on a dry basis) were also added. The admixture was mulled for 3 minutes. Subsequently, 250 g $H_2O$ were added to the speed muller and the contents mulled for an additional 3 minutes. A gelling solution containing 120 ml $NH_4OH$ and 120 ml $H_2O$ was then added to the above mixture. The gel was then dried overnight at 250° F. The dried gel was then ground to a powder in a Retsch grinder.

501 g of the above powder were then added to the speed muller together with a total of 340 ml $H_2O$. The powder-water mixture was then speed-mulled for a total of 22 minutes. The above speed-mulled mixture was then extruded through a 5/64 inch die plate. The extrudate was subsequently dried for a two-day period at 250° F.

The above 60 wt% ZSM-5/40 wt% $Al_2O_3$ support material was then impregnated in a conventional manner to yield a catalyst containing 0.5 wt% Pd. The present catalyst was designated as Catalyst D.

80 cc of the subject comparative catalyst were then tested in the pilot plant in the manner set out in Example II.

The feedstocks employed in the instant tests were a SAE 10 wt oil as described above and a phenol-extracted SAE 40 wt oil (designated "RAF-40") having the following properties.

| | |
|---|---|
| Sulfur | .306 wt % |
| C | 86.10 wt % |
| H | 13.49 wt % |
| Total Nitrogen | 167 ppm |
| Basic Nitrogen | 45 |
| Pour Point | 140° F. |
| KV vis at 100° C. | 13.31 cst. |

The following Table 4 sets forth the results of the tests.

TABLE 4

| | | | | | | | | | | | |
|---|---|---|---|---|---|---|---|---|---|---|---|
| Time on stream, hrs | 22 | 46 | 70 | 94 | 118 | 164 | 194 | 218 | 236 | 308 | 332 |
| Avg Cat. Temp., °F. | 601 | 601 | 601 | 601 | 600 | 649 | 703 | 700 | 700 | 700 | 700 |
| LHSV | .48 | .49 | .51 | .48 | .43 | .56 | .53 | .22 | .28 | .26 | .26 |
| $H_2$, SCFB | 3778 | 5215 | 5067 | 5372 | 5800 | 3288 | 6663 | 11424 | 6378 | 9206 | 9919 |
| Pressure, psig | 800 | 800 | 800 | 800 | 800 | 800 | 800 | 800 | 800 | 800 | 800 |
| Feed | RAF-10 | RAF-10 | RAF-10 | RAF-10 | RAF-10 | RAF-40 | RAF-40 | RAF-40 | RAF-40 | RAF-40 | RAF-40 |
| Yields, wt % | | | | | | | | | | | |
| Methane | .36 | .50 | .26 | .28 | .26 | .04 | .22 | .38 | .16 | .21 | .22 |
| Ethane | 1.24 | 1.71 | .97 | 1.02 | .96 | .23 | 1.24 | 2.12 | .77 | 1.00 | .84 |
| Propane | 12.44 | 17.17 | 12.14 | 12.87 | 12.99 | 2.82 | 9.31 | 15.97 | 5.71 | 7.70 | 8.18 |
| Butane | 5.82 | 8.03 | 7.39 | 7.83 | 8.42 | 2.42 | 6.57 | 11.26 | 4.33 | 5.94 | 6.49 |
| $C_5+$ naphtha | 2.69 | 3.5 | 4.25 | 4.18 | 3.72 | 3.94 | 6.09 | 6.38 | 3.76 | 5.18 | 8.33 |
| Distillate | 5.81 | 3.23 | 2.75 | 3.86 | 5.45 | 4.97 | 7.98 | 12.45 | 10.91 | 10.61 | 9.72 |
| Lube Oil | 50.92 | 58.27 | 57.64 | 59.25 | 62.23 | 71.23 | 67.78 | 54.91 | 55.52 | 62.76 | 59.11 |
| Total Liquid | 59.42 | 65.00 | 64.65 | 67.30 | 71.40 | 80.20 | 81.85 | 73.74 | 70.19 | 78.55 | 77.16 |
| Properties of Lube Oil | | | | | | | | | | | |
| Pour pt, °F. | −30 | −30 | −35 | −30 | −30 | 55 | 35 | — | 10 | 20 | 5 |
| Viscosity cSt @ 100° C. | 6.92 | 6.73 | 6.70 | 6.92 | 6.75 | 16.51 | 16.40 | 16.00 | 16.49 | 16.37 | 16.16 |
| Viscosity cSt @ 40° C. | 57.57 | 54.07 | 53.04 | 57.57 | 53.92 | 195.30 | 197.50 | 198.00 | 204.90 | 198.75 | 198.80 |
| Viscosity index | 65 | 68 | 70 | 65 | 69 | 87 | 85 | 80 | 82 | 84 | 81 |
| Sulfur, wt % | 390 | 430 | 520 | 570 | 570 | 2030 | 1410 | 940 | 800 | 860 | 960 |
| Nitrogen, ppm | 3.0 | 3.5 | 6.7 | 5.9 | 6.2 | 74.0 | 112.0 | 70.0 | 69.0 | 30.0 | 90.0 |
| Time on stream, hrs | 357 | 380 | 404 | 428 | 457 | 478 | 530 | 548 | 572 | 596 | 626 |
| Avg. Cat. Temp., °F. | 700 | 701 | 701 | 704 | 600 | 600 | 601 | 600 | 599 | 599 | 528 |
| LHSV | .30 | .26 | .24 | .24 | .49 | .52 | .55 | .49 | .49 | .48 | .46 |
| $H_2$, SCFB | 18629 | 18887 | 19860 | 18107 | 5243 | 4734 | 4480 | 5423 | 5739 | 6241 | 5171 |
| Pressure, psig | 800 | 800 | 800 | 800 | 800 | 800 | 800 | 800 | 800 | 800 | 800 |
| Feed | RAF-40 | RAF-40 | RAF-40 | RAF-40 | RAF-40 | RAF-40 | RAF-40 | RAF-40 | RAF-40 | RAF-10 | RAF-10 |
| Yields, wt % | | | | | | | | | | | |
| Methane | .21 | .21 | .15 | .14 | .02 | .02 | .04 | .05 | .02 | .02 | .01 |
| Ethane | .96 | .98 | .71 | .64 | .18 | .17 | .32 | .39 | .20 | .22 | .13 |
| Propane | 7.65 | 7.75 | 6.09 | 5.55 | 3.66 | 3.44 | 4.96 | 6.00 | 4.11 | 4.47 | 2.85 |
| Butane | 6.46 | 6.55 | 5.68 | 5.18 | 4.36 | 4.09 | 5.56 | 6.71 | 4.76 | 5.18 | 3.33 |
| $C_5+$ naphtha | 5.90 | 5.45 | 5.94 | 5.82 | 9.38 | 7.62 | 4.44 | 5.67 | 11.48 | 10.05 | 8.14 |
| Distillate | 9.52 | 13.74 | 13.59 | 13.00 | 3.69 | 2.74 | 8.42 | 2.32 | .26 | 2.40 | 5.57 |
| Lube Oil | 60.76 | 56.79 | 58.32 | 59.12 | 74.74 | 72.84 | 64.86 | 70.24 | 65.69 | 69.36 | 65.62 |
| Total Liquid | 76.18 | 75.99 | 77.86 | 77.94 | 87.24 | 83.19 | 77.72 | 78.23 | 77.43 | 81.80 | 79.34 |
| Properties of Lube Oil | | | | | | | | | | | |
| Pour pt, °F. | 10 | 5 | 15 | 10 | 45 | 30 | −15 | −5 | 5 | 15 | −10 |
| Viscosity cSt @ 100° C. | 16.27 | 16.48 | 16.72 | 16.31 | 6.38 | 6.13 | 6.42 | 6.33 | 6.28 | 6.23 | 6.40 |
| Viscosity cSt @ 40° C. | 199.70 | 200.15 | 209.46 | 204.69 | 44.95 | 42.29 | 47.39 | 45.84 | 46.92 | 43.70 | 49.23 |
| Viscosity index | 82 | 84 | 82 | 80 | 87 | 86 | 80 | 80 | 73 | 85 | 69 |
| Sulfur, wt % | 910 | 700 | 700 | 710 | 1240 | 1200 | 840 | 960 | 1040 | 1020 | 830 |
| Nitrogen, ppm | 77.0 | 43.0 | 28.0 | 30.0 | 19.0 | 14.0 | 5.3 | 8.1 | 10.0 | 10.0 | 9.8 |

DISCUSSION OF TEST RESULTS

A least squares fit analysis of the data obtained from Examples II and III was used to obtain the following comparative figures for a 5° F. pour point product set out in Table 5.

TABLE 5

| Catalyst | Lube Yield, wt % | Total Liquid Yield, wt % | VI |
|---|---|---|---|
| Invention | 67.4 | 84.1 | 87 |
| Comparative | 67.2 | 74.1 | 79 |

As is evident from the above table, the process of the invention yields a product possessing a substantially higher viscosity index than the comparative process for products possessing the same pour point. The total liquid product yield for the process of the invention is also substantially higher than that obtained using the prior art dewaxing process employing a ZSM-5 zeolite.

EXAMPLE IV

Essentially, the results set forth in Example II can be obtained by first extracting the feedstock with NMP and then hydrotreating the feedstock prior to dewaxing in accordance with the present invention. The feedstock described in Example II is extracted in a conventional manner using 1.5 volumes solvent per volume SAE-10 feed. The NMP-extracted SAE 10 raffinate is hydrotreated in a fixed bed, downflow, pilot plant associated with automatic controls to maintain constant flow of gas and feed and constant temperature and pressure using 128 cc of HDS-3, a commercially available American Cyanamid Ni-Mo-containing hydrotreating catalyst loaded into a 0.75" inside diameter reactor having a bed length of 20½". After the catalyst is presulfided with 8 vol% $H_2S$ in hydrogen at 300° F. for one hour, 400° F. for one hour, and 600° F. for one hour, the feed is hydrotreated at a total unit pressure of 800 psig, a temperature of 675° F., and a liquid feed rate of 0.50 volumes of feed per volume of catalyst per hour (LHSV) ($V_o/V_c$/hrs) at a constant gas flow rate corresponding to 800 standard cubic feet per barrel (SCFB) and the product is collected over several days and stripped of $H_2S$ in a five-gallon can with nitrogen until $H_2S$ is not detected using a Drager tube.

What is claimed is:

1. A process for catalytically dewaxing thereby reducing the pour point of a hydrocarbon feedstock which process comprises contacting the feed with hydrogen under catalytic dewaxing conditions in the presence of a catalyst composition comprising a crystalline borosilicate molecular sieve and a hydrogenation component consisting essentially of nickel.

2. The process of claim 1 wherein the catalytic dewaxing conditions include a temperature of about 500° to about 900° F., a pressure of about 100 to about 3,000 psig, LHSV of about 0.1 to about 20.0 reciprocal hours and hydrogen addition rate of about 500 to about 20,000 SCFB.

3. The process of claim 1 wherein the crystalline borosilicate is dispersed within a non-zeolite porous refractory inorganic oxide matrix component.

4. The process of claim 3 wherein the hydrogenation component is deposited on the dispersion of borosilicate and matrix components.

5. The process of claim 3 wherein the maxtrix component comprises alumina.

6. The process of claim 5 wherein the hydrogenation component is deposited on the matrix component of the borosilicate-matrix dispersion.

7. The process of claim 1 wherein the catalytic dewaxing conditions include a temperature of about 500° to about 750° F., a pressure of about 300 to about 900 psig, a LHSV of about 0.20 to about 5.0 reciprocal hours, and hydrogen addition rates of about 2000 to about 5,000 SCFB.

8. The process of claim 1 wherein the hydrocarbon feed is a partially dewaxed solvent refined stock.

9. The process of claim 1 wherein the hydrogenation component is present in an amount ranging from 0.01 to about 10 wt%.

10. The process of claim 1 wherein the hydrogenation component is present in an amount ranging from about 0.01 to about 5 wt%.

11. The process of claim 1 wherein the borosilicate molecular sieve comprises a HAMS-1B crystalline borosilicate molecular sieve.

12. The process of claim 11 wherein the borosilicate molecular sieve contains less than about 100 ppm sodium.

13. The process of claim 11 wherein the crystalline borosilicate molecular sieve is prepared by reacting under crystallization conditions, in the substantial absence of a metal or ammonium hydroxide, an aqueous mixture containing an oxide of silicon, an oxide of boron, and ethylene-diamines, in a molar ratio to silica of above about 0.05.

14. The process of claim 13 wherein the aqueous mixture further contains an alkylammonium cation or precursor of an alkylammonium cation.

15. The process of claim 11 wherein the crystalline borosilicate molecular sieve is prepared by reacting under crystallization conditions in the substantial absence of a metal or ammonium hydroxide, an aqueous mixture containing an oxide of silicon, an oxide of boron, and ethylene diamine, in a molar ratio to silica of above about 0.05, wherein the crystalline borosilicate molecular sieve contains at least about 9,000 ppm boron.

16. The process of claim 15 wherein the aqueous mixture further contains an alkylammonium cation or precursor of an alkylammonium cation.

17. A process for catalytically dewaxing thereby reducing the pour point of hydrocarbon feeds having a pour point of at least about 30° F. comprising contacting the feed with hydrogen at about 500° to about 750° F., a pressure of about 400 to about 800 psig, a LHSV ranging from about 0.25 to about 2.0 reciprocal hours and a hydrogen addition rate of about 2,500 to about 5,000 SCFB in the presence of catalyst comprising a hydrogenation component comprising about 0.4 to 2.0 wt% nickel and support component comprising an AMS-1B crystalline borosilicate molecular sieve.

* * * * *

UNITED STATES PATENT OFFICE
CERTIFICATE OF CORRECTION

Patent No. 4,560,469  Dated December 24, 1985

Inventor(s) P. Donald Hopkins, Thomas D. Nevitt, and E. E. Unmuth

It is certified that error appears in the above-identified patent and that said Letters Patent are hereby corrected as shown below:

Column 3, line 18, "and contacting" should be --the contacting--
Column 3, line 24, "Chen," should be --Chen--
Column 3, line 28, "Gorring," should be --Gorring--
Column 3, line 47, "x-ray" should be --X-ray--
Column 5, line 65, "present" should be --presence--
Column 7, line 19, "borosilicte" should be --borosilicate--
Column 7, line 20, "component" should be --components--
Column 8, line 27, "shape-selective" should be --the shape-selective--
Column 9, line 49, "oils" should be --oil--
Column 10, line 7, "686,077" should be --686,096--
Column 10, line 58, "Group VIP" should be --Group VIB--
Column 11, line 50, "blender" should be --Blendor--
Column 11, line 66, "catalyst B" should be --Catalyst B--
Column 11, line 68, "$Ni(NO_3)_2 \cdot 6H_2O$ should be --$Ni(NO_3)_2 \cdot 6H_2O$--
Column 12, line 6, "9320" should be --932°F--
Column 15, line 57, "and hydrogen addition rate of" should be --and a hydrogen addition rate of--
Column 15, line 60, "non-zeolitc" should be --nonzeolitic--
Column 16, line 34, "ethylene-diamines" should be --ethylenediamines--
Column 16, line 44, "ethylene diamine" should be --ethylenediamine--

Signed and Sealed this

Nineteenth Day of August 1986

[SEAL]

Attest:

DONALD J. QUIGG

Attesting Officer  Commissioner of Patents and Trademarks